Oct. 23, 1934.  S. C. IDE  1,978,205

VENDING MACHINE

Filed Feb. 10, 1932   11 Sheets-Sheet 1

INVENTOR.
Sherwood C. Ide
BY Ira Milton Jones
ATTORNEY.

Oct. 23, 1934.　　　　　S. C. IDE　　　　　1,978,205

VENDING MACHINE

Filed Feb. 10, 1932　　　11 Sheets-Sheet 2

Fig. 2.

INVENTOR.
Sherwood C. Ide
BY
Ira Milton Jones
ATTORNEY.

Oct. 23, 1934.  S. C. IDE  1,978,205
VENDING MACHINE
Filed Feb. 10, 1932  11 Sheets-Sheet 3

Oct. 23, 1934.     S. C. IDE     1,978,205

VENDING MACHINE

Filed Feb. 10, 1932     11 Sheets-Sheet 5

INVENTOR.
Sherwood C. Ide
BY
Ira Milton Jones
ATTORNEY.

Oct. 23, 1934.  S. C. IDE  1,978,205
VENDING MACHINE
Filed Feb. 10, 1932  11 Sheets-Sheet 7

INVENTOR.
Sherwood C. Ide
BY
ATTORNEY.

Oct. 23, 1934.  S. C. IDE  1,978,205

VENDING MACHINE

Filed Feb. 10, 1932  11 Sheets-Sheet 8

INVENTOR.
Sherwood C. Ide
BY
ATTORNEY.

Oct. 23, 1934.  S. C. IDE  1,978,205

VENDING MACHINE

Filed Feb. 10, 1932   11 Sheets-Sheet 9

INVENTOR
BY  Sherwood C. Ide
ATTORNEY

Oct. 23, 1934.  S. C. IDE  1,978,205

VENDING MACHINE

Filed Feb. 10, 1932  11 Sheets-Sheet 10

INVENTOR.
Sherwood C. Ide
BY
ATTORNEY.

Oct. 23, 1934.  S. C. IDE  1,978,205

VENDING MACHINE

Filed Feb. 10, 1932  11 Sheets-Sheet 11

INVENTOR.
Sherwood C. Ide
BY
Ira Milton Jones
ATTORNEY.

Patented Oct. 23, 1934

1,978,205

UNITED STATES PATENT OFFICE 1,978,205

VENDING MACHINE

Sherwood C. Ide, Indianapolis, Ind., assignor to Ira Milton Jones, Milwaukee, Wis.

Application February 10, 1932, Serial No. 592,013

28 Claims. (Cl. 312—96)

This invention relates to certain new and useful improvements in vending machines and has particular reference to coin controlled machines for vending packaged articles of different descriptions.

In general the machine of this invention comprises a suitably encased vertically arranged endless conveyer having a plurality of article carriers movable past a display window, to enable the contents of all of the carriers to be quickly ascertained and a selected carrier moved to a discharging position, at which the actuation of coin controlled mechanism is operable to discharge the contents of the particular carrier from the machine.

It is an object of this invention to provide a machine of the character described in which the conveyer is selectively movable in either direction and for any distance without requiring the insertion of a coin to permit the entire contents of the machine to be quickly displayed.

Another object of this invention resides in the provision of novel means for maintaining the trays or carriers of the goods to be vended, horizontally throughout their movement with the conveyer.

Another object of this invention resides in the provision of novel mechanism operable upon the insertion of a proper coin therein and the actuation of a convenient handle, to tilt or tip one of the trays or carriers so as to discharge its contents.

Another object of this invention resides in the provision of a trap door for closing the discharge opening through which the articles are expelled from the machine and the provision of means whereby the trap door opens simultaneously with the tilting or tipping of the carrier whose contents are being discharged.

A further object of this invention is to provide a machine of the character described which is of simple, rugged construction.

Another object of this invention is to provide means for displaying a description of the particular article carried by each tray or carrier.

It is another object of this invention to provide means operable by the lever for tipping the tray in discharging position to automatically shift the conveyer one way or the other to move the tray to be tipped to its exact discharging position.

A still further object of this invention resides in the provision of means for preventing injury to the instrumentalities of the machine by abusive or abnormal application of force to the manually operable actuating handle.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, one complete example of the physical embodiment of this invention is illustrated constructed according to the best mode so far devised for the practical application of the principles thereof, and in which:

Fgure 2 is an enlarged section view illustrating the coin actuating mechanism, taken on the plane of the line 2—2 of Figure 1;

Figure 18 is a detail section view illustrating the construction of the sliding door for closing the slot through which the actuating lever projects.

Referring now more particularly to the accompanying drawings, the numeral 1 represents an outer enclosing casing which consists of an elongated vertical box 2 having side walls 3, a rear wall 4, and bottom and top 5 and 6 respectively. The open front of the box is closed by a removable cover 7 whose lower end interengages with suitable retaining means carried by the box and whose upper end has a key controlled lock 8, the bolt of which is engageable behind a depending flange 9 to hold the cover in position.

The cover 7 has a window opening 10 closed by a plate of glass 11, or other suitable transparent material, through which a considerable number of the articles contained within the machine may be viewed.

The articles are supported on individual carriers or trays 12 carried by an endless conveyer, to be later described, and which is movable upon the actuation of a handle 13 projecting from the lower side of the box, to locate any desired tray in a discharging position. The discharging position is at the bottom of the window and is indicated by an arrow 14.

With the tray containing the desired article aligned with the arrow 14, depression of a lever 15 projecting through a vertical slot 15' in the cover, subsequent to the insertion of a proper coin into a coin slot 16, through mechanism to be later described, tips the tray to discharge the article carried thereby, into a discharge chute 17 at the bottom of the machine. To preclude the insertion of wires or other implements into the vertical slot 15' in an attempt to pilfer the machine, a gate 18 is provided which normally closes the slot and moves with the lever 15.

As best illustrated in Figure 18, the gate 18 has an opening 20 through which the lever projects and is slidably mounted in guides 19 fixed to the inner face of the cover 7.

The entire mechanism of the vending machine is contained within the outer casing, and the casing back wall 4 carries a pair of spaced guides 21 which engage and properly center the supporting structure of the mechanism as it is inserted.

The supporting structure or frame of the mechanism comprises left and right side plates 22 and 23 respectively, maintained in spaced relation by front and rear tranverse plates 24 and 25, respectively. These transverse plates are substantially U shaped in cross section and their left and right flanges 26 and 27 respectively, are directed outwardly to form part of guide tracks for the conveyer, as will be later described.

To accommodate the conveyer, the transverse plates are of less width than the distance between the side plates, but are rigidly secured thereto by brackets 28.

Figure 8:
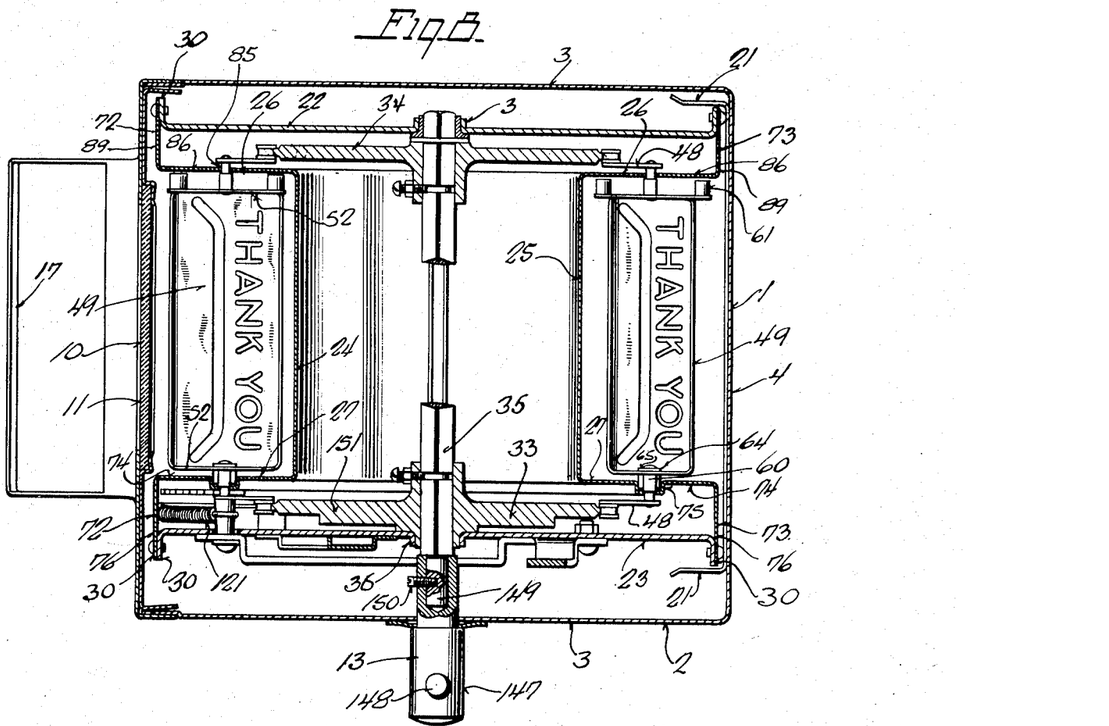
Figure 8 is a cross section view looking down and taken on the plane of the line 8—8 of Figure 1.
Figure 9:
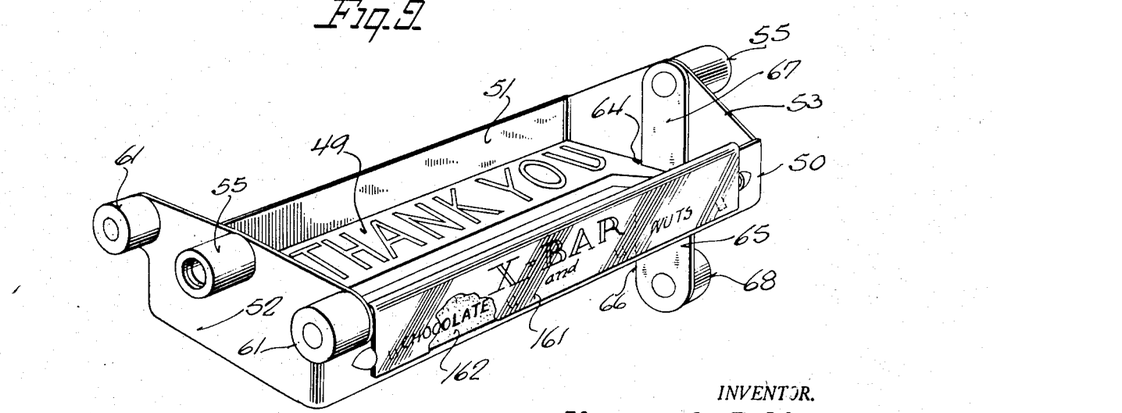
Figure 9 is a perspective view of one of the trays or article carriers.
Figure 12:
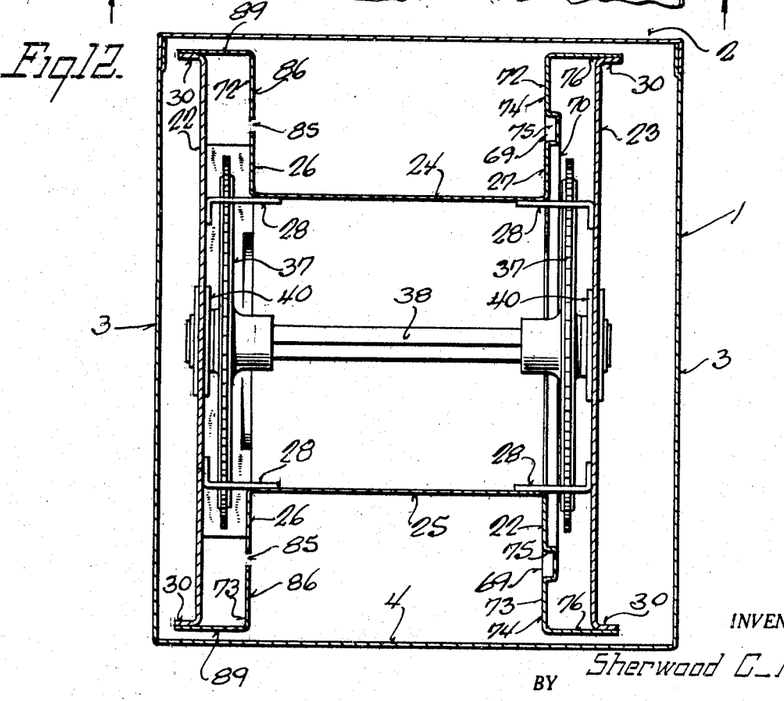
Figure 12 is a cross section view through the machine looking up on the plane of the line 12—12 of Figure 11.

As best illustrated in Figures 8 and 12, the side plates are provided with outward flanges 30 at their front and rear edges, and to increase the rigidity of the supporting structure, crossed braces 31 have their ends fixed to the rear flanges 30 of the side plates.

The conveyer which carries the article carriers or trays 12 is supported from the side plates and comprises a pair of endless chains 32 trained over a pair of lower sprockets 33 and 34 mounted on a shaft 35 journaled in fixed bearings 36 carried by the side plates, and a pair of upper sprockets 37 mounted on a shaft 38 whose ends are journaled in adjustable bearings 39.

The adjustable bearings 39 are carried by plate members 40 vertically slidably connected with the side plates by lugs 41 and 42 slidably received in vertical slots 43 and 44 respectively, formed in the side plates.

To accommodate the bearings 39, elongated openings 45 are formed in the adjacent portions of the side plates, and to adjust the plates and consequently the bearings, vertical tension screws 46 are provided. The tension screws 46 engage the lugs 42 and suitable supports carried by the side plates, and as will be readily apparent, tightening of the nuts on the screws draws the bearings upwardly to tighten chains.

The chains 32 are of the conventional roller chain type and at predetermined spaced points the regular links on the inside of each chain are replaced by T shaped links 47 having arms 48 which extend outwardly to support the trays 12.

The trays may be of any desired size and shape and in the present instance some of them are wide and others are narrow to accommodate different sized articles. In all other respects, however, the trays are similar. They are preferably stamped from bendable metal to form substantially shallow troughs each having a bottom 49, front and rear walls 50 and 51 respectively, and left and right end walls 52 and 53 respectively. All of the trays are of the same length and their end walls 52 and 53 carry studs 55 which have detachable connections 58 with bushings 60 fixed to the ends of the chain carried arms 48. The detachable connections 58 permit the trays to be removed and attached to the conveyers, as will be readily apparent.

The left end wall 52 of each tray has a pair of guide studs 61 fixed to its opposite corners which engage upper and lower tracks 62 and 63 respectively to assist in maintaining the trays in horizontal position during their transfer from one vertical stretch of their movement to the other. It is observed that in the narrow trays, the end walls 52 have sidewise extensions to carry the studs 61 so that all of the studs are spaced apart the same distance.

The bottom of each tray at its right hand end has an opening 64 to receive an arm 65. The arms 65 have wide lower end portions 66 and narrow upper end portions 67. The narrow upper ends 67 are passed upwardly through the openings 64 to overlie the inner surfaces of the adjacent end walls 53 and have their upper ends fixed thereto by the riveted ends of the adjacent bushings 60.

The lower ends 66 of the arms 65 extend downwardly perpendicular to the bottom wall of their trays and at the extreme lower ends carry rollers 68 which engage a track 69 extending along each vertical stretch of the conveyer movement, and upper and lower tracks 70 and 71, respectively, to maintain the trays horizontal throughout their entire travel with the conveyer.

The tracks 69 are on the right side of the machine only, and are formed by the marginal edges of the flanges 27 on the transverse plates 24 and 25, cooperating with front and rear right guards 72 and 73, respectively.

As best illustrated in Figures 8 and 12, the marginal edges of the flanges 27 and the marginal edges of the adjacent flanges 74 of the guards 72 and 73 are offset as at 75 to accommodate the rollers 68 and are spaced apart a distance sufficient to permit the studs 55 to pass therebetween.

The front and rear right guards 72 and 73 respectively, are formed of sheet metal and are substantially right angular in cross section with their flanges 74 in the plane of the flanges 27 of the transverse plates and with their flanges 76 parallel to and overlying the outer surface of the adjacent flanges 30 on the side plate 23, to which they are secured by rivets or other suitable means.

These angular front and rear right guards extend vertically from substantially the bottom point of tangency of the straight line defined by the path of the rollers 68 with the circular path formed during the transition of the trays from one vertical stretch to the other, to a point substantially adjacent the upper point of tangency of the straight stretch with the arcuate path. It is observed that the transverse plates 24 and 25 are of substantially the same height as the front and rear right guards and that their upper ends are connected by the track 70 in which the rollers 68 travel.

Figure 4:
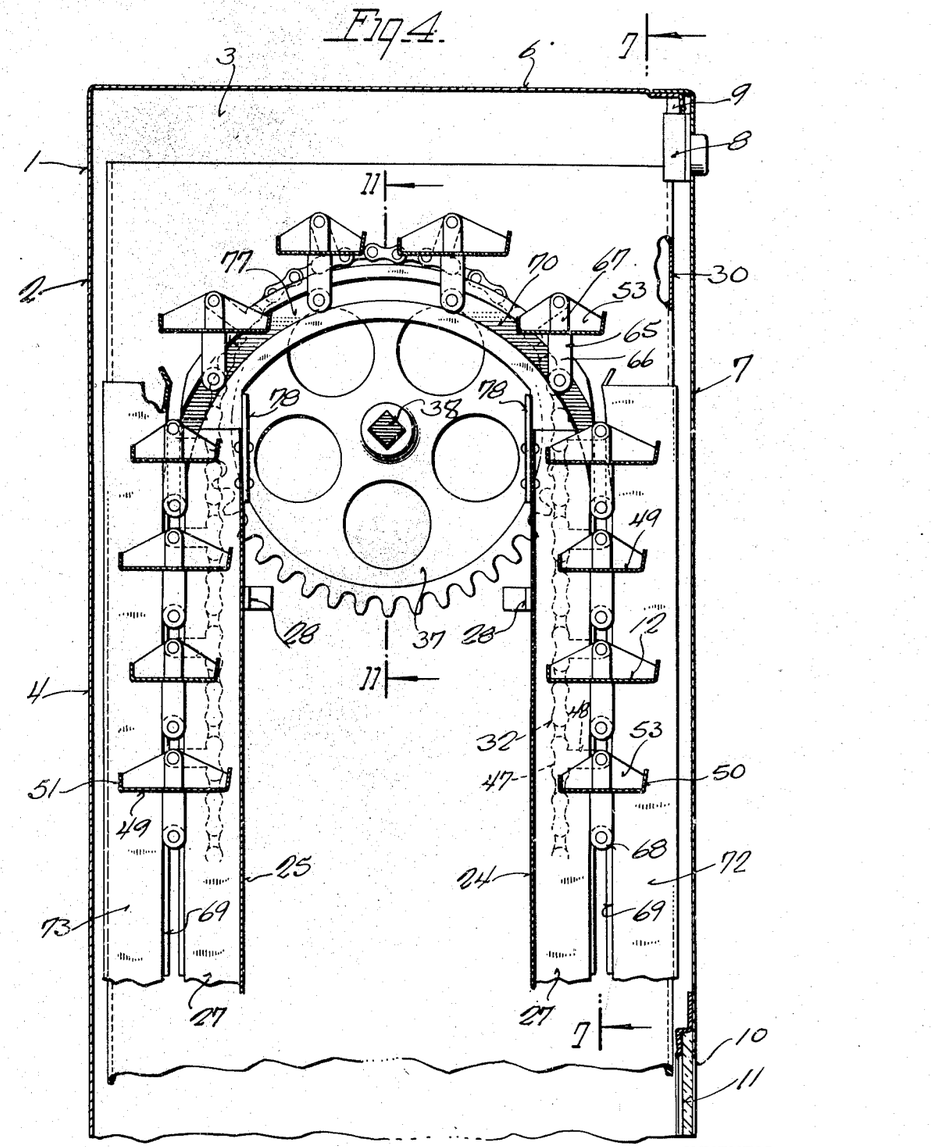
Figure 4 is substantially a continuation of the section view shown in Figure 3 and is taken longitudinally through the machine on the plane of the line 4—4 of Figure 1.
Figure 5:
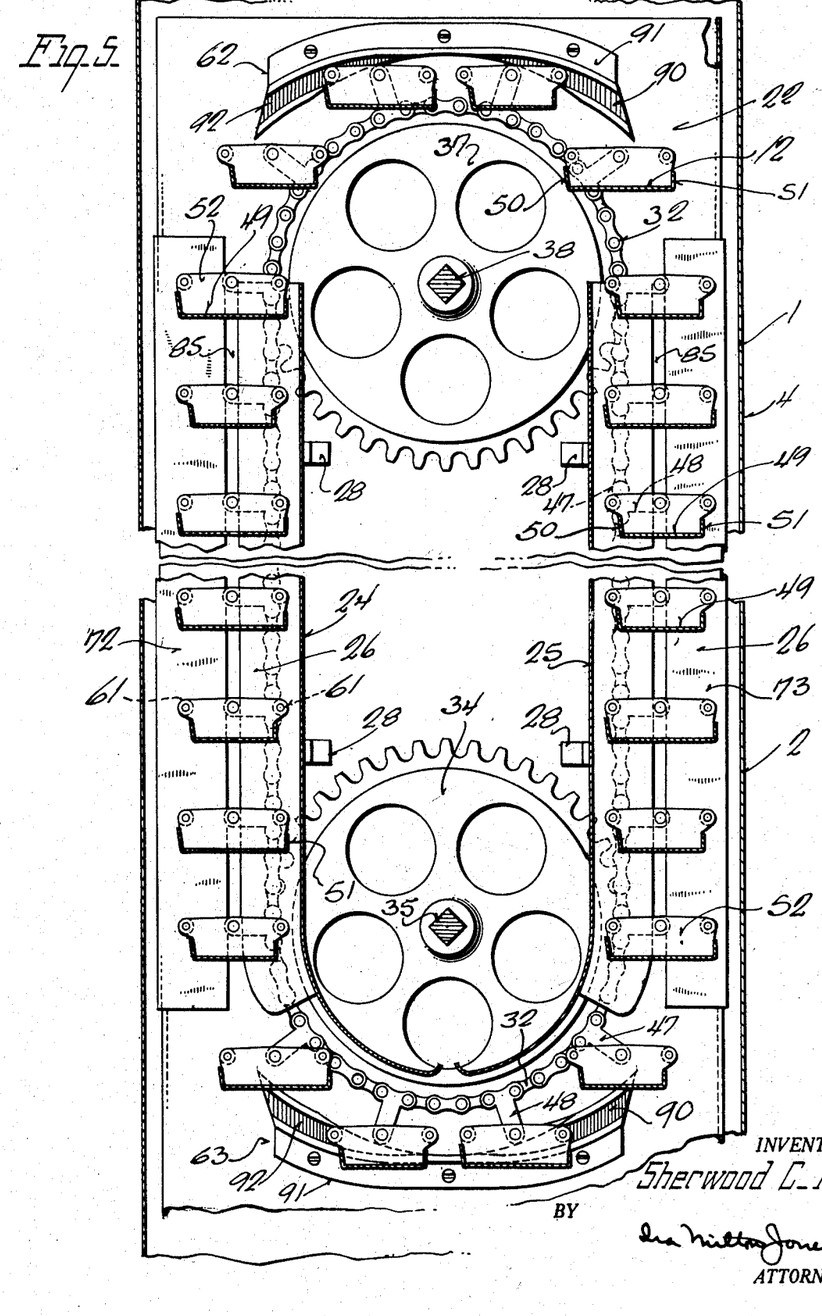
Figure 5 is a longitudinal section view taken through the machine on the plane of the line 5—5 of Figure 1, the middle portion of the machine being broken away.
Figure 6:
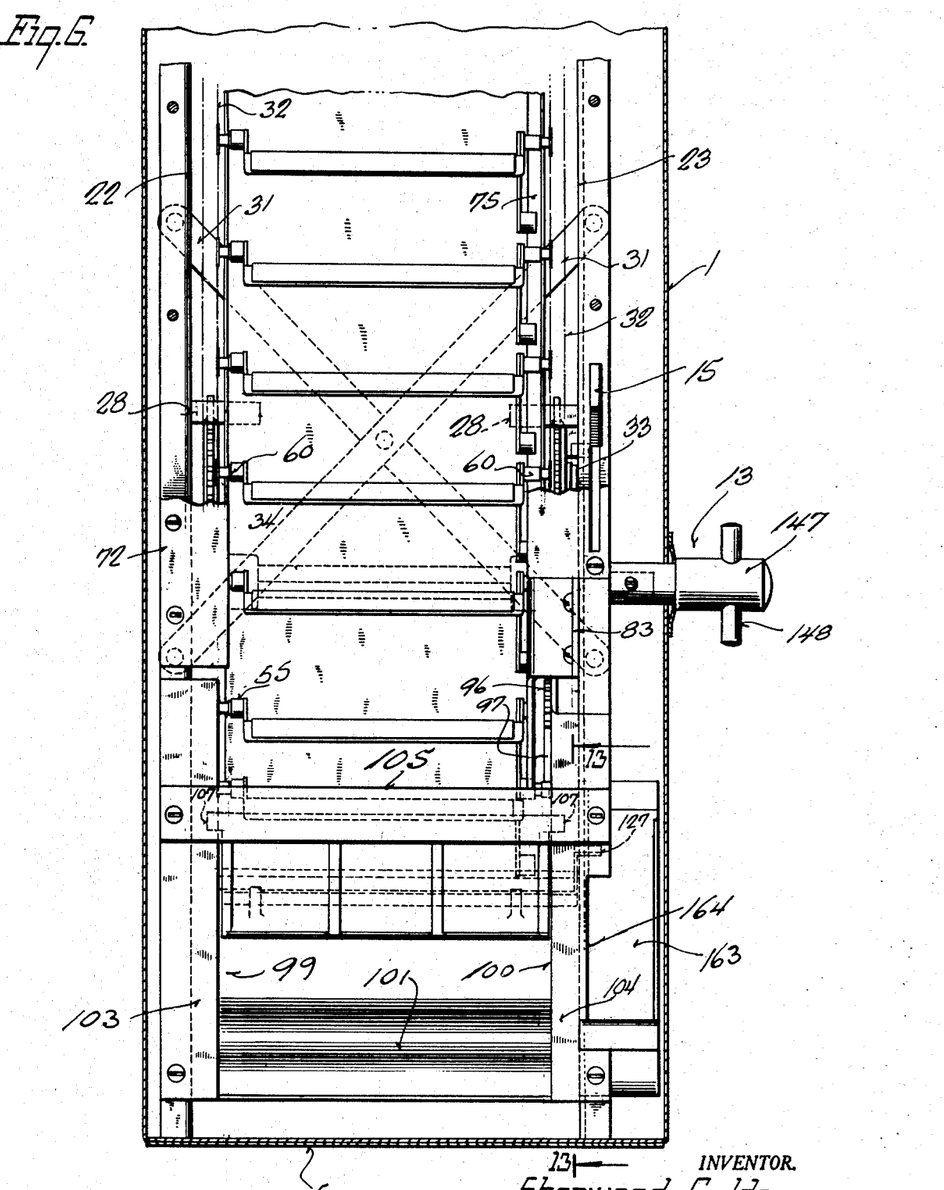
Figure 6 is a section view looking at the front lower portion of the machine and taken on the plane of the line 6—6 of Figure 3.
Figure 7:
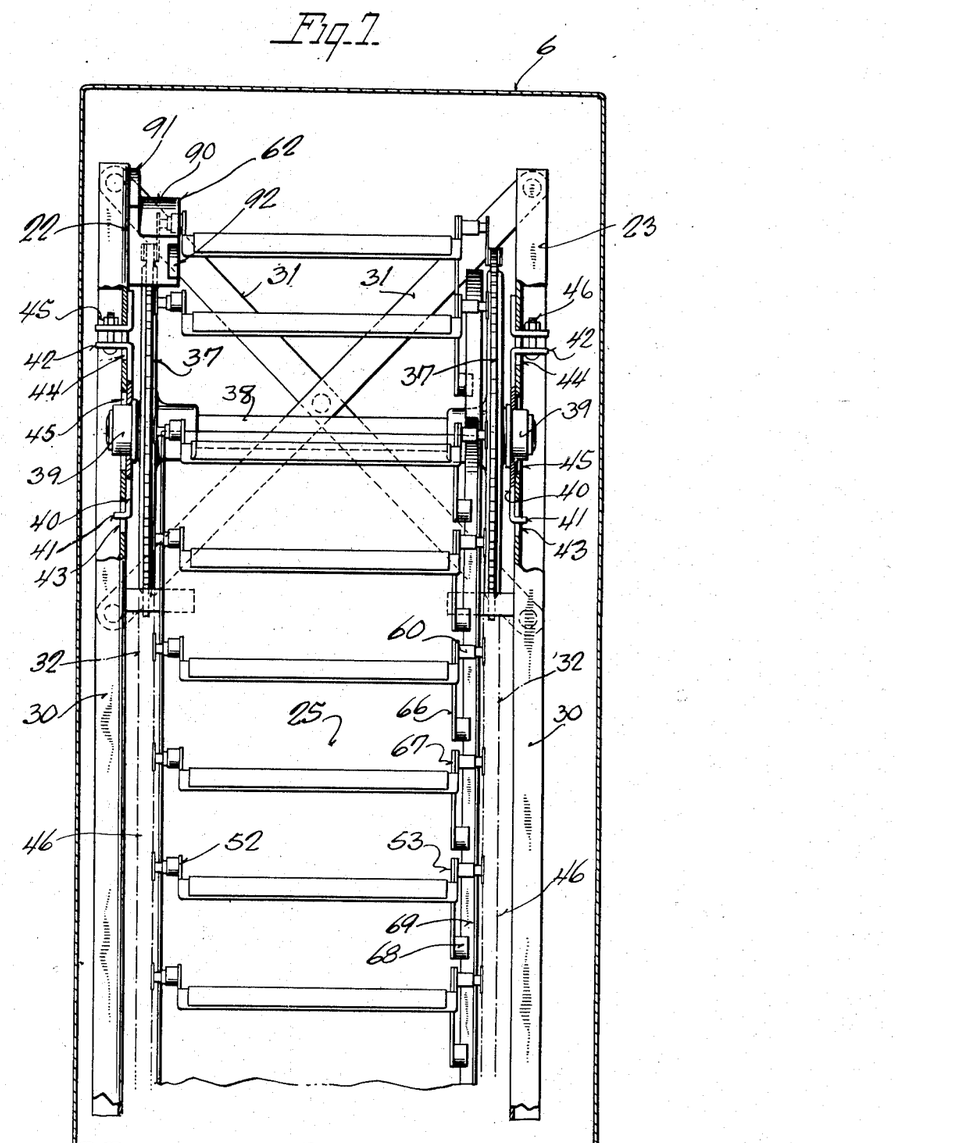
Figure 7 is a section view looking at the front upper portion of the machine, taken through Figure 4 on the plane of the line 7—7.
Figure 11:
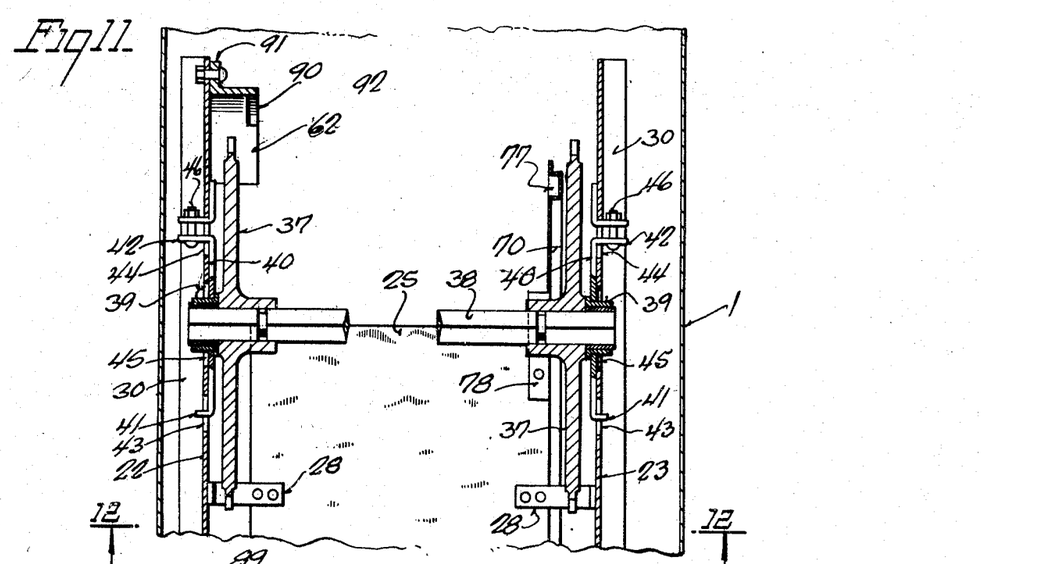
Figure 11 is a section view taken through Figure 4 on the plane of the line 11—11 to illustrate the guide structure at the upper end of the machine, the conveyer chains and carrier trays being omitted.

The track 70 is formed of sheet metal and as best illustrated in Figures 4 and 11, has a channel 77 which provides the track proper and has its ends formed with attaching flanges 78 which are riveted or otherwise secured to the adjacent upper portions of the transverse plates. As will be readily apparent the curved track 70 is tangent to the straight stretches of the tracks 69 so that the rollers 68 which serve to hold the trays in horizontal position move freely from one into the other.

The track 71 at the bottom of the machine, like the track 70, is preferably formed of sheet metal and is stamped to provide a channel 79 which forms the track proper. An attaching bracket 80 formed integrally with one end of the track and secured to the side wall 23 cooperates with a bracket 81 fixed to the side wall 23 and the lowermost portion of the track to rigidly mount the same in position with that end having the attaching bracket 80 tangent to the lower end of the rear track 69.

The opposite end of the track 71 terminates short of the lower end of the front vertical track 69 and the distance therebetween is partially bridged by a short section of channel track 82. This short section of track has an attaching bracket 83 formed integrally therewith which is secured to the adjacent front portion of the side plate 23 in any suitable manner. The short section of channel track 82 is tangent to the lower end of the front track 69 and terminates short of the end of the curved bottom track 71 a distance slightly greater than the length of a short section of movable channel track 84 which normally bridges the distance between the track 71 and the track section 82 to provide an uninterrupted path for the rollers 68.

The movable track section 84 is mounted for swinging movement about a fixed axis to tilt or tip the tray whose roller is received therein, in a manner to be later described.

It is observed that the vertical tracks 69, besides holding the trays in horizontal position, form a rigid guide for the adjacent conveyer chain to hold it against swaying back and forth. The other conveyer chain is held against swinging by vertical tracks 85 formed by the space between the marginal edges of the flanges 26 of the transverse plates 24 and 25 and the marginal edges of the flange 86 of right-angular front and rear left side guards 72 and 73 respectively.

The flanges 86 of these guards lie in the plane of the flanges 26 and the space therebetween, which forms the tracks 85, is sufficient to receive the studs 55 connecting the trays with the adjacent chain. The other flanges 89 of the front and rear left guards overlie the adjacent flanges 30 on the side plate 22, to be secured thereto by rivets or the like.

It is observed that the side guards cooperate with the transverse plates to form vertical passages or chambers at the front and rear of the machine within which the trays move up and down, the supports for the trays passing through the vertical slots in the side walls of these chambers which provide the tracks as herein described.

The formation of these chambers in this manner completely conceals the mechanism and consequently affords an exceptionally neat compartment for the article carriers or trays and the goods carried thereby, and presents a pleasing appearance from the window in the front cover.

During the transition of the trays from one vertical stretch to the other, they are held in horizontal position through the cooperation of the engagement with the rollers 68 in the tracks 70 and 71 and the engagement of the studs 61 with the tracks 62 and 63. The tracks 62 and 63 are substantially identical in construction and may be stamped from sheet metal or die cast. In each instance a substantially arcuate boss 90 extended from an attaching flange 91, is provided with a grooved channel 92 in which the studs 61 are received as the trays are conveyed therepast. The attaching flange 91 may be secured in any suitable manner directly to the inner face of the side wall 22. It is observed that the inner surfaces of the arcuate bosses 90 are cut away to accommodate the arms 48 of the conveyer chain.

Figures 15, 16, 17:
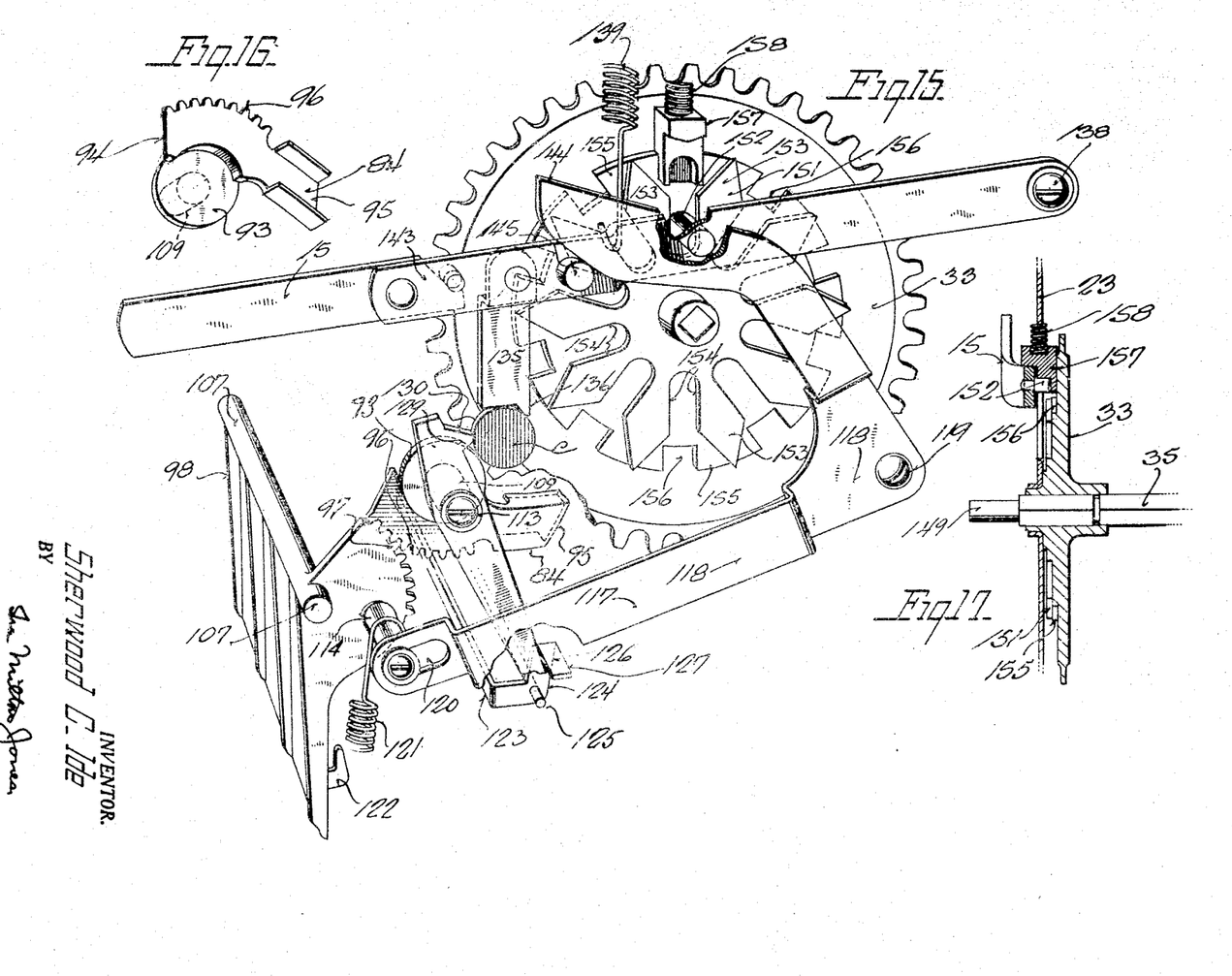
Figure 15 is a detail perspective view of the coin controlled mechanism for discharging the contents of the trays.
Figure 16 is a detail perspective view of a movable track section which serves to tilt the tray to discharging position.
Figure 17 is a detail section view taken on the plane of the line 17—17 of Figure 2.

Again referring to the movable track section 84; this element, as best illustrated in Figure 16, consists of a disc 93 having an offset segment 94 one side of which is extended and the outer end 95 thereof is substantially U shaped in cross section to provide the movable track section per se.

Part of the segment 94 has its outer marginal edge concentric to the disc and provided with gear teeth 96 to mesh with a gear segment 97 formed integrally with a trap door 98 normally closing the discharge opening 17.

As will be later described, the movable track section 84 and the trap door 98 are simultaneously movable to tip the tray and open the door upon actuation of coin controlled mechanism.

The supporting structure for the movable track section and the trap door comprises a sub-frame mounted in the lower front portion of the mechanism. This sub-frame consists of a pair of spaced side walls 99 and 100 connected by a transverse wall 101. The side walls 99 and 100 together with the transverse wall 101, form a discharge chute leading to the discharge opening 17 and provide substantially a bottom for the front vertical compartment within which the trays and articles carried thereby are movable up and down.

The bottom or transverse wall 101 is preferably curved and may be formed integral with the side wall 99, its opposite marginal edge portion being riveted or otherwise secured to a flange 102 extended laterally from the bottom edge of the side wall 100. Both side walls 99 and 100 have outwardly directed lateral attaching flanges 103 and 104 respectively which form substantially continuations of the flanges 87 and 72 respectively of the front left and right guards 89 and 76 and overlie the marginal flanges 30 on the side plates 22 and 23 to be secured thereto in any suitable manner.

To increase the rigidity of the sub-frame and the entire lower portion of the mechanism, a brace 105 extends across the upper front of the sub-frame and has its opposite ends secured to the flanges 30 of the side plates.

At its upper marginal edge, the transverse bottom wall 102 is directed laterally as at 106 to provide a ledge against which the outer free end of the trap door 98 abuts when in closed position. The trap door 98 is of a width substantially equal to the distance between the side walls 99 and 100 and is hingedly mounted for swinging movement to and from closed position, by trunnions 107 formed integrally with the upper portion of the trap door and journaled in openings formed in the side walls 99 and 100.

The gear segment 97 is formed integrally with the trap door and lies in engagement with the inner surface of the side wall 100, and as it meshes with the gear segment 96 on the movable track section, it follows that the track section gear segment 96 is in the plane of the segment 97 and also engages the inner surface of the side wall 100.

The disc 93 of the movable track section is received in a pocket formed by offsetting the upper end portion of the side wall 100 as at 108, and a stud shaft 109 extended axially from the disc 93 is journaled in an aperture in the offset portion 108, so that the movable track section is swingingly mounted from the side wall 100.

Figures 13, 14:
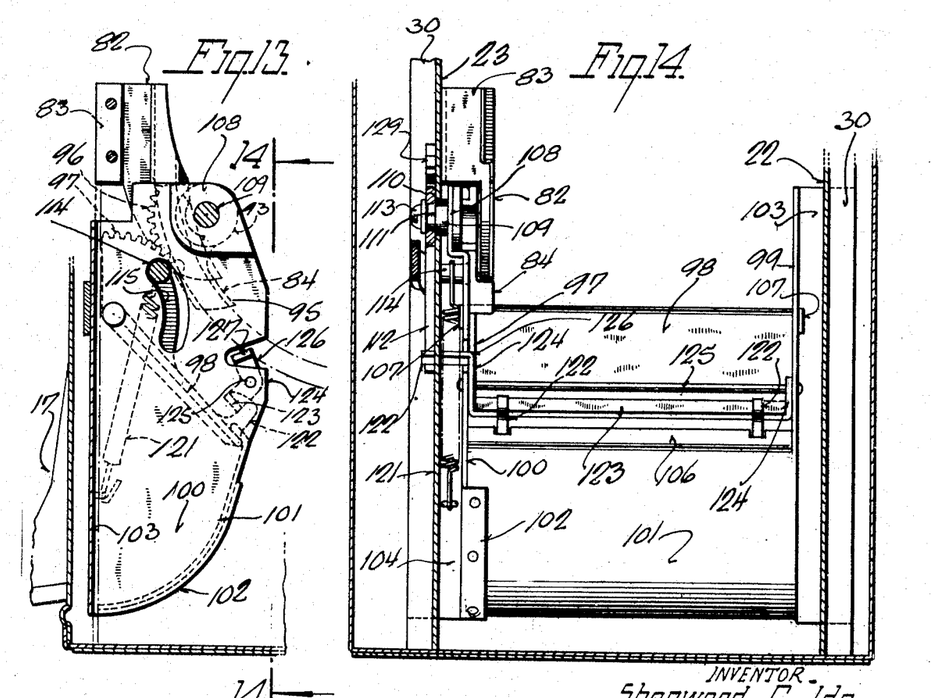
Figure 13 is a detail section view taken through the lower portion of the machine on the plane of the line 13—13 of Figure 6.
Figure 14 is a detail section view taken on the plane of the line 14—14 of Figure 13.

The trunnion 109 as best illustrated in Figure 14 extends beyond the wall of the offset portion 108 to project through an aligned opening 110 in the side wall 23. The extreme end of the trunnion is reduced in diameter as at 111 and mounts a trigger lever 112 which overlies the outer surface of the side wall 23. The trigger lever 112 is maintained assembled with the trunnion end by a screw 113 threaded in the end of the trunnion and having its head of greater diameter than the reduced trunnion end 111. In this manner a freely pivotal mounting for the trigger lever is provided and the movable track section held in position. The trigger lever 112 forms part of the coin actuated mechanism, to be later described, for opening the trap door and tilting the trays to discharge their contents.

It is observed that by locating the disc 93 of the movable track section within the depression or offset portion 108, the plane of the outer face of the disc 93 lies substantially in the plane of the inner surface of the wall 100 and as this plane is outwardly of that occupied by the chain carried arms 48, it is apparent that the arms are free to pass the disc 93.

As hereinbefore noted the gear sector 97 formed integrally with the trap door, overlies the inner surface of the wall 100, and extended outwardly from this gear sector is a stud 114 which passes through an arcuate slot 115 in the wall 100 and a second arcuate slot 116 formed in the side wall 23 in alignment with the slot 115. Both slots are concentric to the adjacent trap door trunnion 107 so that during movement of the trap door to and from closed position, the stud is free to move back and forth within the arcuate slots.

The stud 114 extends beyond the outer face of the side wall 23 and is connected with one arm 117 of a bell crank lever 118 pivotally mounted, as at 119, on the outer surface of the side wall 23. The connection of the outer end of the bell crank arm 117 with the stud 114, by reason of an elongated slot 120 formed in the arm, accommodates the radial motion of the stud and arm as the door is swung to and from closed position. The bell crank, as will be hereinafter more fully described, provides the means for closing the trap door.

Connected with the stud 114 between the side wall 100 of the sub-frame and the adjacent side plate 23 is a tension spring 121, the other end of which is hooked to a fixed support beneath the hinged mounting of the trap door, so that the tension of the spring yieldably urges the trap door to open position and through the gear connection of the trap door with the movable track section, likewise yieldably urges the movable track section to its tray tipping position.

To hold the trap door in closed position and the movable track section in its normal track continuing position, a trigger latch mechanism is provided. This mechanism comprises two hooks 122 formed on the rear face of the trap door for engagement with a trigger bar 123. The trigger bar 123 has an elongated hook engaging portion extending across the width of the trap door and has its ends directed laterally as at 124 to be journalled on a shaft 125 suitably mounted in the side walls 99 and 100 of the sub-frame.

Figures 1, 1B:
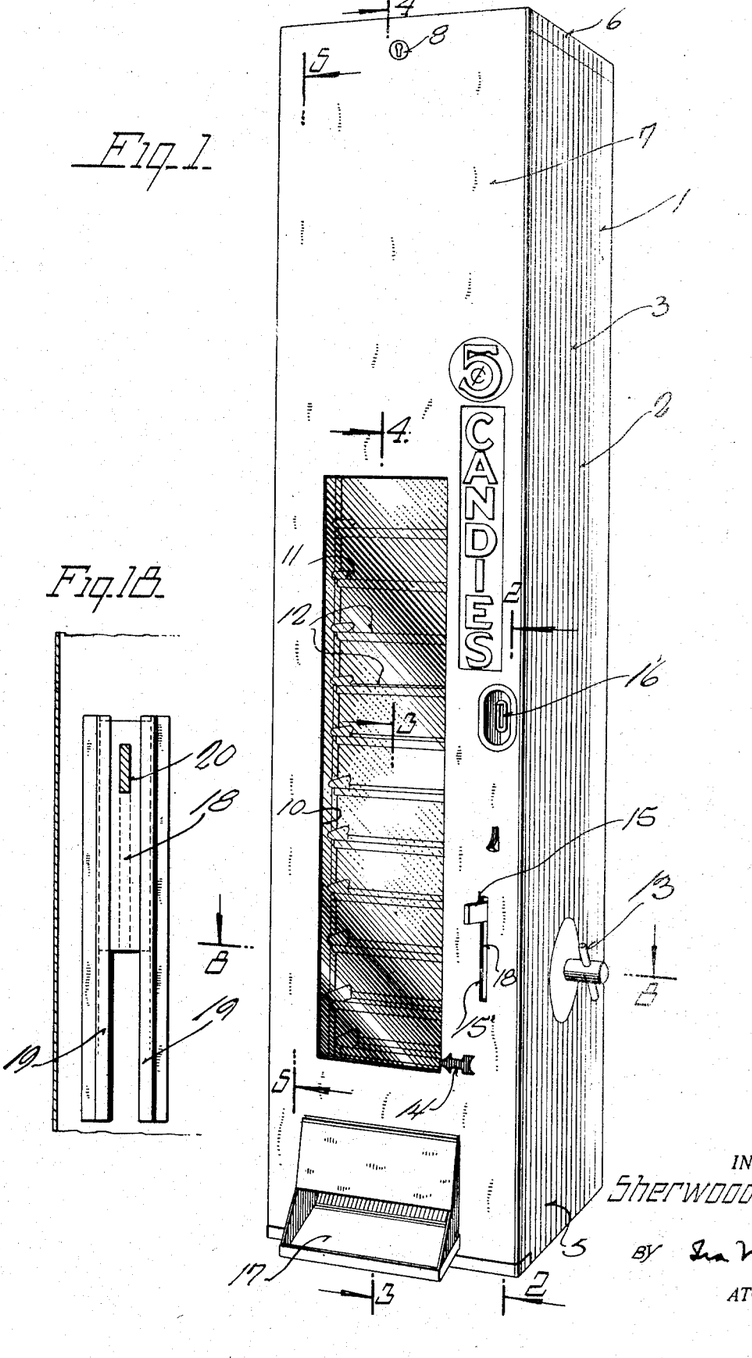
Figure 1 is a perspective view of a vending machine embodying this invention.
Figure 2:
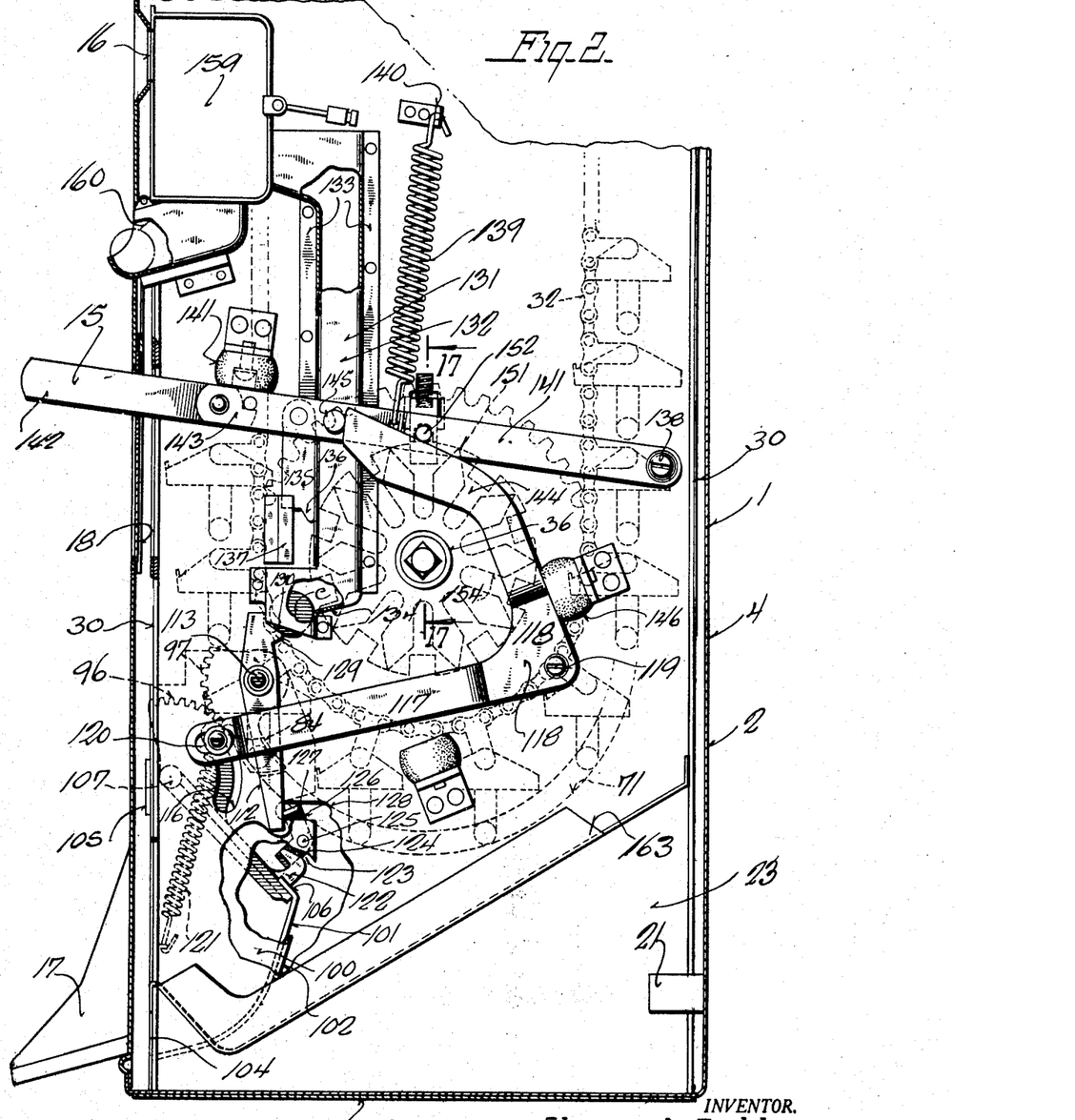
Figure 3:
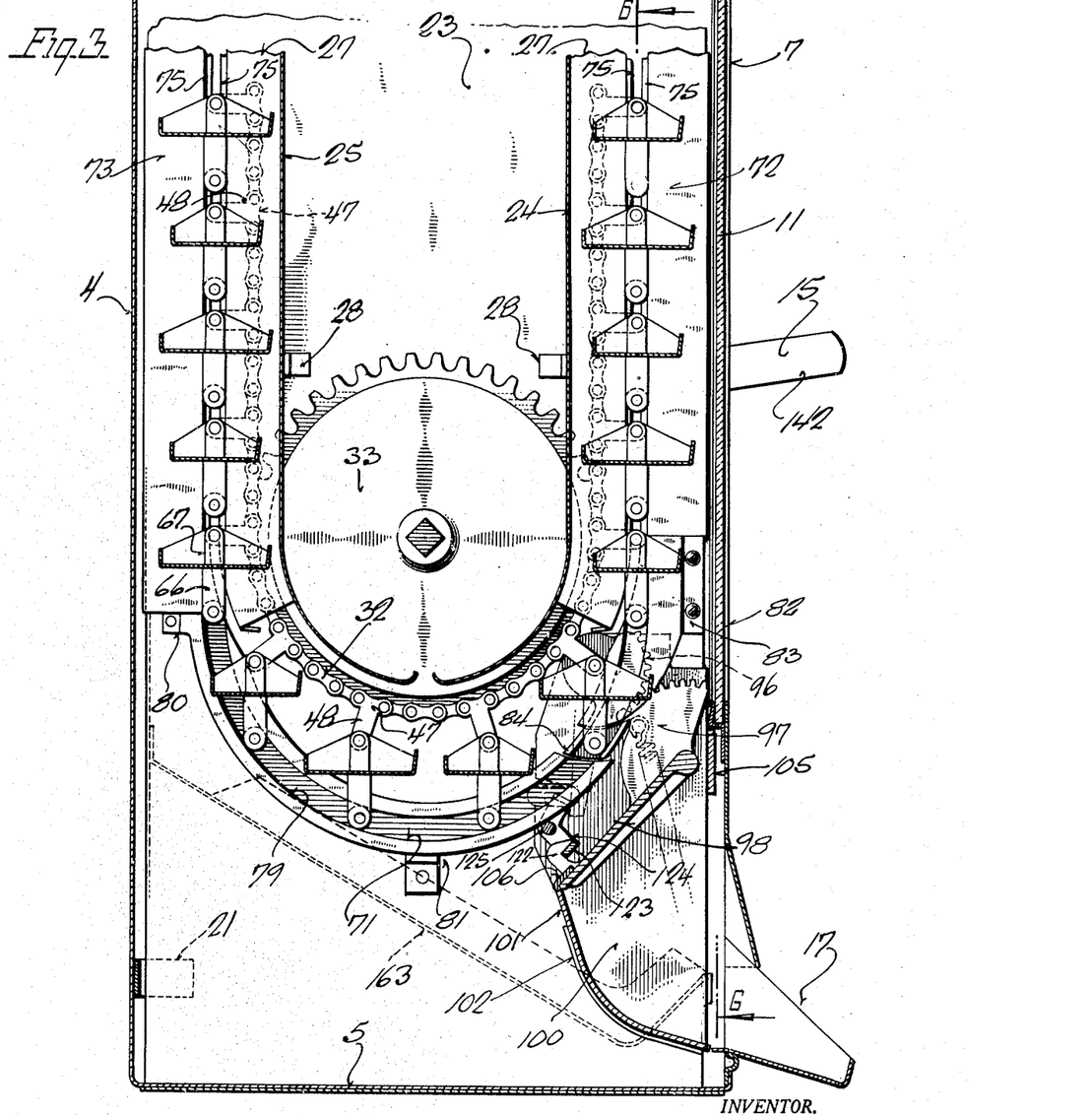
Figure 3 is a section view illustrating particularly the discharge chute and its associated mechanism, said view being taken on the plane of the line 3—3 of Figure 1.

The laterally directed end 124 adjacent the side wall 100 has an upward extension 126, the extreme end of which is directed outwardly to form a finger 127 which passes through an elongated opening 128 in the side wall 23 to be engaged by the lower adjacent end of the trigger lever 112 in such a manner that the movement of the trigger lever about its pivotal mounting to the right, with respect to Figure 2, swings the trigger bar about the axis of the shaft 125 to disengage the same from the hooks 122. Obviously, as soon as the trigger bar is disengaged from the hooks, the spring 121 pulls the trap door open and swings the movable track section to tray tipping position.

The necessary movement of the trigger lever 112 to effect release of the trap door and the movement of the track section is brought about by the actuation of coin controlled mechanism now about to be described.

As best illustrated in Figure 2, the upper end of the trigger lever 112 has a sidewise projection 129 the upper edge of which is inclined. This inclined upper edge 130 lies directly adjacent the lower open end of a coin chute 131. The coin chute 131 is preferably formed of sheet metal and comprises an elongated vertical channel 132 provided with attaching flanges 133 which lie flat against the adjacent side wall 23 and are secured thereto.

The lower end of the chute is directed at an angle toward the front of the machine and then downwardly again toward the trigger lever, with the inclined surface 130 of the trigger lever partially closing the open bottom of the chute, so that a coin C inserted into the chute rests against the inclined surface 130 and the opposite side wall 134 of the chute.

A coin in this position lies in the path of a coin pusher 135 which is vertically movable down into the laterally directed lower end of the chute. This coin pusher is carried by the actuator lever 15 so that upon depression of the lever the lower end of the pusher moves down onto the coin and forces it downwardly. Such movement of the coin swings the trigger lever about its pivotal mounting in a counter-clockwise direction, releasing the coin from the chute. The motion of the trigger lever in a counter-clockwise direction moves the trigger bar 123 out of engagement with the hooks 122 and releases the trap door for movement by the spring 121 as hereinbefore described.

The lower end of the coin pusher 135 is preferably formed with a projection 136 to engage in back of the coin and insure its movement down through the open bottom of the coin chute, and the pusher 135 is guided for movement by having one edge lying against the adjacent side of the coin chute and its opposite marginal edge portion slidably received beneath a guide 137 fixed to the side wall 23.

The actuating lever 15 which carries the coin pusher is pivotally mounted from the side wall 23, as at 138, and is yieldably retained in its raised or inoperative position by an expansion spring 139 having its lower end connected with the lever and its upper end hooked to a suitable support 140. A stop 141 limits the upward movement of the lever by the spring 139 and to preclude possible injury to the mechanism by forced raising of the outer end of the lever 15, it is preferably formed in two sections, an inner section 141 which extends from the pivotal mounting 138 to a point adjacent the stop 141 and an outer section 142 connected through a knuckle joint 143 with the inner section. Hence any forced upwardly movement of the outer end of the actuating lever merely results in the swinging of the lever outer end about its connection with the inner portion.

The bell crank 118 which as hereinbefore described is provided to close the trap door against the action of the spring 121, has the outer end of its other arm 144, lying in the path of a stud 145 secured to the lever section 141, during its upward movement by the spring 139. In this manner, the bell crank lever is moved about its pivotal mounting 119 and closes the trap door, inasmuch as the spring 139 overbalances the spring 121.

It is observed that the connection between the actuating lever 15 and the bell crank lever is such that in the event the trap door is held closed either manually or through some portion of the mechanism becoming stuck, the forced depression of the lever 15 imparts no movement whatsoever to the bell crank lever. In other words, the opening of the trap door and the swinging of the movable track section to tray tilting position is effected by the action of the spring 121, and it is absolutely impossible to apply force from the lever 15 to this mechanism. To limit the movement of the bell crank lever about its pivotal mounting 119, in the clockwise direction, a stop 146 is provided.

As hereinbefore brought out, the conveyer carrying the trays is movable in either direction upon the action of a handle 13 projecting from the side of the outer casing. In the present instance the handle 13 comprises a shaft 147 with a cross pin 148 forming a hand engaging portion, but obviously any suitable construction may be employed. The inner end of the handle shaft passes through an opening in the side wall of the outer casing and is bored to receive the adjacent reduced end 149 of the shaft 35. A screw 150 serves to maintain the handle secured to the shaft. It is thus impossible to remove the handle except by first removing the front cover 7 on the outer enclosing casing.

Upon movement applied to the conveyer through the handle 13, the carrier or tray containing the desired article may be brought into discharging position as indicated by the arrow 14 on the front cover of the casing. But, in the event that the selected tray is not properly positioned, i. e. its roller 68 is not squarely engaged with the movable track section, the subsequent depression of the handle 15 automatically shifts the conveyer one way or the other to locate the selected tray in its exact discharging position.

Figure 10:
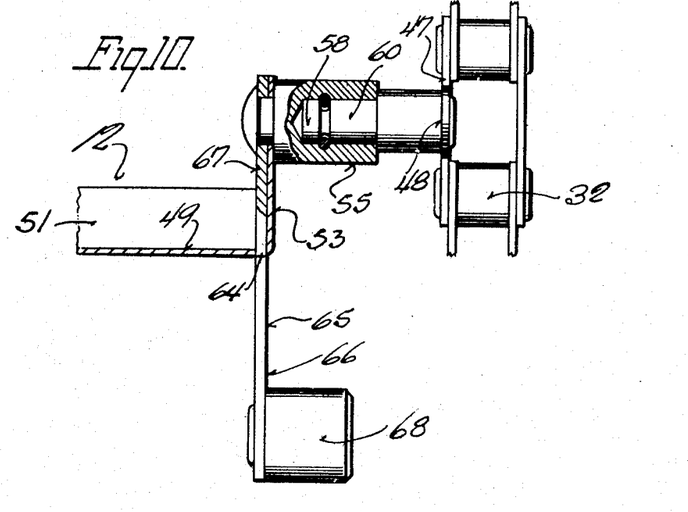
Figure 10 is a detail view illustrating the detachable connection of the trays with the conveyer chains.

The means for effecting this automatic alignment, comprises a star wheel 151 formed either integrally with the sprocket 33 or secured to its outer surface and with which a stud 152 carried by the inner section of the actuating lever 15 cooperates. The stud 152 is adapted to enter the spaces between the teeth 153 of the star wheel as the lever is depressed, and moves the sprocket in the direction necessary to effect proper alignment. As best illustrated in Figure 10, the outer ends of the teeth 153 are V shaped and come to a point to insure the stud being guided into one of the parallel walled spaces 154 between the roots of the teeth.

It is observed that the teeth 153 which form the star wheel occupy a plane outwardly of a disc-like portion 155 directly adjacent the outer face of the sprocket. The outer periphery of this disc-like portion, has square notches 156 in alignment with the spaces between the teeth 153, and into which a stop member 157, yieldably urged downwardly by a spring 158, engages after the lever moves down beyond a predetermined point. This stop member 157 is slidably mounted in the side wall 23 and upon movement of the actuating lever to its normal inactive position, is lifted out of engagement with the square notches 156 by the engagement of the inner end of the stud 152 therewith.

To guard against the insertion of slugs or improper coins, a detector mechanism 159 is mounted at the coin slot 16 to receive the coins as they are inserted. The detector mechanism, however, forms no part of this invention and is therefore not shown in detail. If the coin inserted is proper, in all respects, the detector mechanism passes it into the upper end of the coin chute 131, but if for some reason the coin is improper or a slug is inserted, it is rejected and drops down into an auxiliary chute 160 opening to the front of the machine.

It is observed that the elongated vertical disposition of the coin chute enables a substantial number of coins to be inserted at one time and the machine may be actuated successively until the supply of coins has been exhausted.

After the coins have been pushed from the bottom of the chute by the actuation of the mechanism, they drop down into a receptacle formed by an inclined wall 163 extending transversely across the space between the side plate 23 and the adjacent side wall 3 of the outer casing. At its front end the wall 163 is bent upward to be engaged over the lower edge of a slot 164 cut in the flanges 30 and 104 of the side plate 23 and sub-frame side wall 100 respectively. The slot 164 continues upwardly a sufficient distance to afford a convenient entrance to the coin receptacle from the front of the machine, providing of course, that the front wall is removed.

A novel feature of this invention resides in the provision of means on the front wall of each tray for carrying indicia descriptive of the goods or articles supported in the particular tray or carrier. For this purpose the front wall of each tray has a clip 161 of celluloid or other transparent material engaged thereover to retain a card 162 bearing the desired indicia.

Another novel feature dealing with the construction of the trays, is the stamping of the words "Thank you" in the bottom of each tray which upon tilting of the tray to discharge its contents, is displayed to the customer.

*Operation*

In using the vending machine, the customer moves the conveyer carrying the trays, by means of the handle 13 to position the tray containing the desired article in its discharging position indicated by the arrow 14. Obviously if none of the trays visible through the window contain the article desired, the entire contents of the machine may be quickly displayed by merely turning the handle 13 in one direction or the other, this operation being possible without necessitating the insertion of a coin.

Having located the carrier containing the desired article in discharging position, the customer inserts a coin and depresses the lever 15. During the initial depression of the lever 15, the conveyer is shifted one way or the other, if necessary, to position the selected carrier in exact discharging position with its guide roller 68 in the movable track section.

As soon as the conveyer is properly located, the stop 157 engages the adjacent square shouldered recess 156 and locks the conveyer against movement, so that it is impossible to shift the conveyer after the discharging operation has begun.

Continued depression of the lever 15 forces the coin which has dropped down through the chute 131 and rests on the upper inclined surface 130 of the tripping lever 112, downwardly from the chute to swing the lever 112 about its pivotal mounting. This swinging movement of the lever releases the latch holding the door and movable track section in their normal positions, for movement by the spring 121 and immediately upon the release of the latch the door is swung open and the movable track section swings about its pivotal mounting to tip the selected tray and discharge its contents from the machine.

As hereinbefore noted, the return of the door and movable track section to their normal positions is effected by the lifting of the bell crank 118 during the return of the lever 15 to its raised position. The fact that the actuating lever does not have a positive connection with the bell crank precludes disruption of the proper relationship between these two elements by forced downward pressure on the actuating handle while the door is held closed either manually in an attempt to defeat the machine, or by some mechanical defect.

Inasmuch as the door remains open as long as the handle 15 is depressed, it is possible to reach into the discharge opening and grasp the door to prevent its return to closed position. Holding the door in this manner also prevents the normal return of the handle 15 to its raised position. Consequently if no means, such as the knuckle joint 143 which divides the lever 15 into two sections, were provided, it would be possible to damage the mechanism by holding the door open and forcing the outer end of the lever upwardly.

However in the present instance injury to the mechanism in this manner is entirely precluded for the only force which can be applied to the instrumentalities through the medium of the actuating lever 15 is a downward force incident to the normal operation of the machine.

Hence it follows that to again operate the machine it is necessary that the handle 15 be permitted to return to its raised position which, through the medium of the bell crank lever, returns the door and the movable track section to their normal positions where the latch mechanism holds them.

What I claim as my invention is:

1. In a vending machine, a closed casing having a discharge outlet a plurality of carriers within the casing for articles to be vended, an endless conveyer for the carriers, means operable from the exterior of the casing for moving the conveyer to locate any desired carrier in position for discharging its contents into said discharge outlet, and means for effecting movement on the part of the carrier so located to discharge its contents into said discharge outlet.

2. In a vending machine, an enclosure having a discharge opening, a plurality of carriers for articles to be vended, endless conveyer means supporting the carriers, means for moving the conveyer means to locate any desired carrier in a discharging position adjacent the discharge opening, a door normally closing the opening, and means for simultaneously opening the door and discharging the contents of said carrier.

3. In a vending machine, a plurality of carriers, endless conveyer means supporting the carriers, a track, means connected with the carriers and engaging the track for holding the carriers horizontal throughout their movement with the conveyer means, means for moving the conveyer means to locate any desired carrier in a discharging position, a movable track section with which the track engaging means of the carrier in discharging position engages, and means for moving said track section to tilt the carrier out of its normal horizontal position and discharge its contents.

4. In a vending machine, a plurality of article carriers, an endless conveyer supporting the carriers, a track, means connected with the carriers and engaging the track to maintain the carriers in a horizontal position, a trap door, a movable track section adjacent the trap door, means for moving the conveyer to position any desired carrier adjacent the trap door, with the track engaging means of the selected carrier engaging the movable track section, means connecting the movable track section and trap door for simultaneous movement, and means for simultaneously opening the trap door and moving the movable track section to tilt said carrier out of horizontal position and discharge its contents through the open trap door.

5. In a vending machine, a plurality of article carriers, an endless conveyer supporting the article carriers and adapted to convey them singly into a discharging position, a track, means connected with the article carriers and engaging the track to maintain the article carriers horizontal during their movement with the conveyer, a movable element forming part of the track and adapted to move an article carrier having its track engaging means in engagement with said movable element to a position discharging its contents, and means for moving said element.

6. In a vending machine, a plurality of connected article carriers, means for moving the carriers, a track, means connected with the article carriers and engaging the track to hold the carriers in a predetermined position during their movement, a movable element forming part of the track and adapted upon movement to move the carrier whose track engaging means is engaged therewith out of its normal predetermined position to discharge its contents, and means for moving said element.

7. In a vending machine, an endless conveyer, a plurality of article carriers supported from the endless conveyer and movable therewith in a predetermined path, a track, carrier carried means engageable with the track to maintain the carriers horizontal irrespective of their position of movement with the conveyer, a movable track section adapted to tilt the carrier whose track engaging means is engaged therewith out of horizontal position and discharge its contents, and means for moving said movable track section.

8. In a vending machine, a closed casing having a discharge outlet, a plurality of conveyer carried article carriers movable within the casing to align any carrier with the discharge outlet, means for normally maintaining the carriers horizontal, and means operable from the exterior of the casing for tipping the carrier aligned with the discharge outlet to discharge its contents into said discharge outlet.

9. In a vending machine, an enclosing casing having a discharge outlet, a plurality of conveyer carried article carriers mounted within the casing and movable to position any carrier adjacent the discharge outlet, means for normally maintaining the article carriers horizontal, and means forming part of the means for maintaining the carriers horizontal and adapted upon movement to tip a carrier adjacent the outlet opening so as to discharge the contents of the carrier into said opening.

10. In a vending machine, an elongated vertical casing having a discharge opening near its bottom, a vertically disposed endless conveyer within the casing, article carriers supported from said endless conveyer and movable with the conveyer to selectively position any carrier adjacent the outlet opening, and a movable element with which an article carrier carried part engages when in a discharging position adjacent the discharge outlet and adapted upon movement to tip a carrier out of its normal position and discharge its contents into the discharge outlet.

11. In a vending machine, an elongated vertical casing having a discharge outlet opening near its bottom, an endless conveyer within the casing, a plurality of article carriers supported from the conveyer and movable therewith to position any carrier adjacent the discharge outlet opening, a track in line with the path of movement of the carriers with the conveyer, means connected with the carriers and engaging the track to maintain the carriers horizontal, a movable element forming part of said track and adapted upon movement out of its normal track forming position to tilt the carrier whose track engaging means is engaged therewith so as to discharge the contents thereof into the discharge outlet opening, and means for actuating said movable element.

12. In a vending machine, an elongated vertical casing having a discharge outlet opening near its bottom, a movable door for closing the discharge outlet opening, an endless conveyer within the casing, a plurality of article carriers supported from the endless conveyer and movable therewith to position any carrier adjacent the discharge outlet opening, means for normally maintaining the carriers in a horizontal position, and means for simultaneously opening the door and tipping the article carrier adjacent the discharge outlet opening so that its contents are discharged into the discharge outlet opening.

13. In a vending machine, a casing having a discharge opening, a door normally closing said opening, a plurality of article carriers, a conveyer to which the carriers are movably attached and by which the carriers are movable past the discharge outlet opening, and means for simultaneously moving a carrier aligned with the discharge outlet opening with respect to the conveyer to discharge its contents and for opening the door, whereby the contents of said carrier are discharged through said opening.

14. In a vending machine of the type requiring the insertion of a coin to render the same operable, a casing having a discharge outlet opening, a plurality of conveyer carried article carriers movable within the casing to position any carrier adjacent the outlet opening, means for tilting a carrier positioned adjacent the outlet opening to discharge its contents therefrom into said opening, latch means normally restraining movement of said means for tilting the carriers, and means for rendering said latch means inoperative to release the carrier for tilting.

15. In a vending machine, a plurality of conveyer carried article carriers movable to locate any carrier in a discharging position, means normally maintaining the carriers horizontal, means yieldably tending to tip the carrier in discharging position, latch means for preventing actuation of said yieldable means, and mechanism for moving the latch means to release the yieldable means and effect the tipping of said carrier in discharging position.

16. In a vending machine, an enclosing casing having a discharge opening, a door for closing said opening, a plurality of conveyer carried article carriers movable to position any carrier adjacent the outlet opening, means normally maintaining the carriers in article retaining position, yieldable means tending to simultaneously move a carrier adjacent the outlet opening out of its normal article retaining position and for opening the door, latch means for holding the carrier moving means and the door against actuation by the yieldable means, and mechanism for moving the latch means to release the carrier moving means and door for actuation by the yieldable means.

17. In a vending machine, an elongated upright enclosing casing having a discharge outlet opening near its bottom and an endless conveyer disposed vertically within the casing, a plurality of article carrying trays carried by the endless conveyer and movable therewith, means for normally maintaining the trays horizontal throughout their movement with the conveyer, means for moving the conveyer in either direction for any distance to enable any tray to be positioned adjacent the discharge outlet opening, and means for tilting the tray adjacent the discharge outlet opening to discharge its contents.

18. In a vending machine, an elongated upright casing having a discharge opening near its bottom, a transparent window in one wall of the casing, an endless conveyer disposed vertically within the casing, a plurality of trays for supporting articles to be vended carried by the conveyer and movable with the conveyer past the transparent window, means for maintaining the trays horizontal throughout their movement with the conveyer, means extending exteriorly of the casing for moving the conveyer in either direction and for any distance to enable all of the trays to be quickly moved past the window and to enable any tray to be located adjacent the outlet opening, and means independent of the conveyer moving means and operable to tip the tray adjacent the outlet opening to discharge its contents therefrom.

19. In a vending machine having a discharge opening, a door normally closing the discharge opening, a plurality of article carriers, means for discharging the contents of a carrier adjacent the discharge opening, yieldable means tending to open the door and acuate the carrier discharge means, instrumentalities normally holding the door closed and the carrier discharge means inoperative and operable to release the door and carrier discharge means for actuation, and means having a one-way connection with the instrumentalities for returning the door to closed position and the carrier discharge means to inoperative position to preclude injury to the instrumentalities by forced actuation thereof while the door is held closed.

20. In a vending machine, an elongated vertical casing having a discharge opening, a vertically disposed endless conveyer within the casing and including spaced endless sprocket chains movable in unison, a plurality of open-topped article carrying trays, axially aligned means at the ends of the article carrying trays for readily detachably connecting the trays with the spaced sprocket chains, means exterior to the casing for moving the endless conveyer to selectively position any article carrying tray adjacent the discharge opening, and means for tipping a tray so positioned about the axis of its connection with the sprocket chains to discharge its contents through the discharge opening.

21. In a vending machine, a conveyer, an article carrier movably connected to the conveyer, a movable closure past which the contents of the carrier must move during its discharge from the machine, and means to simultaneously open the closure and move the carrier with respect to the conveyer to effect the discharge of the carrier contents.

22. In a vending machine, a conveyer, an article carrier movably connected to the conveyer, a movable closure past which the contents of the carrier must move during the discharge thereof from the machine, means operatively connected with the movable closure to move simultaneously therewith and operable upon movement thereof to move the carrier with respect to the conveyer to effect the discharge of its contents, and means to effect the simultaneous opening of the closure and actuation of the carrier.

23. In a vending machine, a conveyer, an article carrier movably connected to the conveyer, a movable closure past which the contents of the carrier must move during its discharge from the machine, a member operable to move the carrier with respect to the conveyer to cause the contents thereof to be discharged, a positive interlocking connection between the movable closure and said member whereby said closure opens simultaneously with the actuation of said member, and means to effect such simultaneous motion of the closure and said member.

24. In a vending machine, a tiltable article carrier movable to and from a discharging position, a movable closure member past which the contents of the carrier must move in its discharge from the machine, a member connectable with the carrier when in its discharging position to tilt the carrier and discharge the contents thereof, a gear connection drivingly connecting the closure member and said carrier tilting member so that said members are simultaneously movable, and means to actuate one of said members to effect the discharge of the carrier contents from the machine.

25. In a vending machine, an enclosure having a discharge opening, an article carrier movable within the enclosure and adapted to be located adjacent the discharge opening, a track to guide the movement of the carrier, a movable member forming part of said track and with which a carrier part engages when the carrier is adjacent the discharge opening, a movable closure member normally closing the discharge opening, gear means connecting the movable closure member and movable track member so that said members move in unison, and means operable on one of said members to simultaneously open the closure member and actuate the track member to effect the discharge of the carrier contents from the machine.

26. In a vending machine, an enclosure having a discharge outlet, a movable closure to close said outlet, a conveyer carried article carrier adapted to be positioned adjacent said outlet, a member engageable with part of the carrier when so positioned and adapted to actuate the carrier to effect the discharge of its contents, a gear sector on said member, a gear sector on the movable closure meshing with said first-mentioned gear sector, whereby opening movement of the closure moves said carrier actuating member to effect the discharge of the carrier contents, and means to open the closure.

27. In a vending machine, an enclosure having a discharge outlet, a movable closure to close said outlet, a conveyer carried article carrier adapted to be positioned adjacent said outlet, a member engageable with part of the carrier when so positioned and adapted to actuate the carrier to effect the discharge of its contents therefrom, a gear sector on said carrier actuating member, a gear sector on the movable closure meshing with said first mentioned gear sector, whereby opening movement of the closure moves said carrier actuating member to effect the discharge of the carrier contents, yieldable means at all times tending to open the closure, a latch to hold the closure in its closed position, and means to release the latch to enable opening of the closure and consequently the discharge of the carrier contents.

28. In a vending machine, a casing having a discharge opening, a transparent window in one wall of the casing, an endless conveyer disposed within the casing, a plurality of trays for supporting articles to be vended carried by the conveyer and movable therewith past the transparent window, means extending exteriorly of the casing for moving the conveyer in either direction and for any distance to enable all of the trays to be quickly moved past the window and to enable any tray to be located adjacent the discharge opening, and means independent of the conveyer moving means and operable to tip the tray adjacent the discharge opening to discharge its contents therefrom.

SHERWOOD C. IDE.